Patented Dec. 22, 1953

2,663,708

UNITED STATES PATENT OFFICE 2,663,708

4-HYDROXY-7,8-PHTHALOYL-CINNOLINES AND PROCESS OF PREPARING SAME

Friedrich Ebel, Mannheim-Feudenheim, Germany, assignor to Badische Anilin- & Soda-Fabrik Aktiengesellschaft, Ludwigshafen am Rhine, Rheinland-Pfalz, Bundesrepublik, Germany No Drawing. Application July 16, 1952,
Serial No. 299,221

Claims priority, application Germany
August 28, 1951

8 Claims. (Cl. 260—262)

The present invention relates to 4-hydroxy-7.8-phthaloylcinnolines.

I have found that 4-hydroxy-7.8-phthalolylcinnolines are obtained in a simple manner by treating 1-amino-2-acetylanthraquinones with diazotizing agents in a water-containing sulfuric acid medium.

Suitable initial materials are for example 1-amino-2-acetylanthraquinone itself and also its halogen, nitro, amino or acylamino derivatives, as for example 4-chlor-, 4-brom-, 5-nitro-, 5-amino- or 5-benzoylamino-1-amino-2-acetylanthraquinone. The reaction, in the case of 1-amino-2-acetylanthraquinone, can be represented as follows:

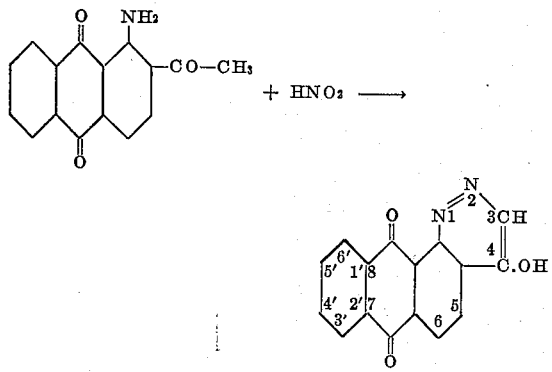

It is preferable to proceed by dissolving the initial material in concentrated sulfuric acid, then introducing about 10 to 70% by weight (with reference to the amount of concentrated sulfuric acid used) of water and finally stirring in somewhat more than the calculated amount of a diazotizing agent, such as oxides of nitrogen, or sodium, potassium or amyl nitrite, advantageously while cooling. There is thus first formed the diazonium compound of the 1-amino-2-acetylanthraquinone; this, however, is converted into the hydroxycinnoline derivative, gradually on allowing the reaction mixture to stand at room temperature, more rapidly upon heating, sometimes only after dilution and sometimes only completely after rendering alkaline. In some cases there takes place simultaneously an exchange of any substituents, as for example chlorine atoms or amino groups, present in the anthraquinone nucleus by hydroxyl groups.

The 4-hydroxy-7.8-phthaloylcinnolines readily obtainable in this way are yellow to violet in color, crystallize excellently and are very stable. They are valuable intermediates for dyestuffs.

The following examples will further illustrate this invention but the invention is not restricted to these examples. The parts are by weight.

Example 1

26.5 parts of 1-amino-2-acetylanthraquinone are dissolved in 200 parts of concentrated sulfuric acid, 100 parts of water are stirred in while cooling and then a suspension of 8.6 parts of sodium nitrite in 100 parts of concentrated sulfuric acid is allowed to flow in at 10° C. during the course of about 15 minutes. The mixture is stirred for an hour at 10° C. and then poured into a mixture of 1200 parts of water and 400 parts of ice. The resulting solution is immediately freed by filtration from a small amount of a black sludge. The clear yellow filtrate begins to cloud after a short time. It is allowed to stand for some hours at room temperature and is then boiled for about an hour to complete the ring closure. It is then cooled and the precipitated crystal pulp is filtered off by suction, washed with water until neutral and dried. 27.2 parts of 4-hydroxy-7.8-phthaloylcinnoline having a melting point of 281° C. to 282° C. are obtained, corresponding to 99% of the theoretical yield.

The new cinnoline derivative forms yellow crystals. It is stable to boiling 98% nitric acid, boiling solutions of chromium trioxide in glacial acetic acid, bromine in nitrobenzene at 180° C., boiling 14% sodium hypochlorite solution, boiling alkaline aqueous permanganate solution and benzoyl chloride at 180° C. Its aqueous suspension becomes colored red with caustic soda solution without going into solution. It cannot be methylated with dimethyl sulfate and caustic soda or with para-toluenesulfonic acid methyl ester in nitrobenzene at 180° C. With sodium hyposulfite it gives a red vat from which it is precipitated again unchanged with air.

Example 2

30 parts of 1-amino-2-acetyl-4-chloranthraquinone are dissolved in 200 parts of concentrated sulfuric acid and 120 parts of water are stirred in while cooling. To the resulting red pulp there are added at 0° C. 70 parts of a nitrose (nitrosyl sulfuric acid) corresponding to 6.8% of $HNO_2$, whereby the whole goes into solution. After about 14 hours, large amounts of orange red crystals have separated out and these are filtered off by suction, washed first with a little 65% sulfuric acid and then with cold water and finally digested for half an hour with hot water. The 4-hydroxy-6-chlor-7.8-phthalolycinnoline thus obtained melts above 300° C. It may be recrystallized from nitrobenzene and then forms lustrous orange-yellow needles.

If the reaction mixture is diluted with 1500 parts of water after the addition of the nitrose, there takes place a complete or substantial exchange of the chlorine by a hydroxyl group and 4.6-dihydroxy-7.8-phthaloylcinnoline is obtained. This dissolves in caustic soda solution to give a blue coloration and can be precipitated from the alkaline solution by means of acid in the form of a violet-brown paste. Its melting point is also above 300° C.

A product which is probably identical therewith is obtained by treating 1.4-diamino-2-acetylanthraquinone in the above-described manner with twice the amount of nitrose in 66% sulfuric acid, diluting the solution with ice-water, filtering rapidly and boiling the filtrate.

*Example 3*

31 parts of 1-amino-5-nitro-2-acetylanthraquinone are dissolved in 200 parts of concentrated sulfuric acid, 100 parts of water are added thereto while cooling and then a suspension of 8.6 parts of sodium nitrite in 100 parts of concentrated sulfuric acid is stirred in at room temperature. After an hour, the solution is introduced into 1600 parts of ice-water and immediately filtered. 4 - hydroxy - 7.8 - (3' - nitrophthaloyl)-cinnoline precipitates from the filtrate on boiling. It forms brown-orange crystals which melt above 300° C.

*Example 4*

38.4 parts of 1-amino-2-acetyl-5-benzoylaminoanthraquinone are dissolved in 400 parts of cold concentrated sulfuric acid. The solution is carefully diluted with 120 parts of water while stirring at a temperature not exceeding 10° C. and then 8.6 parts of finely powdered sodium nitrite are introduced in small portions during the course of 15 minutes while observing the same precautionary measures. The orange-brown solution is stirred for about 14 hours at room temperature and then, without previous filtration, introduced into 1600 parts of ice-water. The precipitate formed is filtered off by suction, washed until neutral and dried. By recrystallization from nitrobenzene, 26.4 parts of 4-hydroxy-7.8-(3'-benzoylaminophthaloyl)-cinnoline are obtained in the form of brown crystals which melt above 300° C.

The product dissolves in concentrated sulfuric acid to give a deep brown coloration and is precipitated from this solution by water as a brown paste. With caustic soda it becomes black-brown in color without dissolving. With sodium hyposulfite it forms a red vat having a good affinity for cotton.

What I claim is:
1. A compound of the general formula

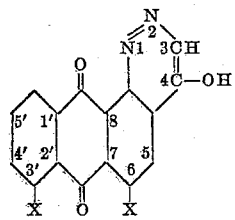

wherein one of the X's stands for a member of the class consisting of hydrogen, bromine, chlorine, hydroxy, nitro, amino and acylamino groups and the other X for hydrogen.

2. The compound of the formula

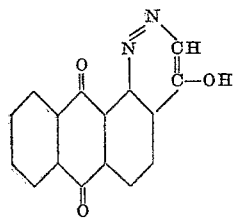

3. The compound of the formula

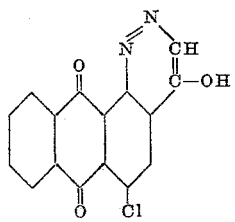

4. The compound of the formula

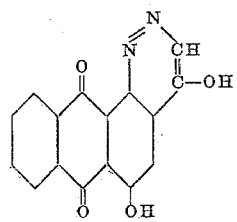

5. The compound of the formula

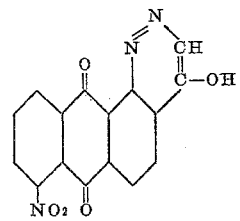

6. The compound of the formula

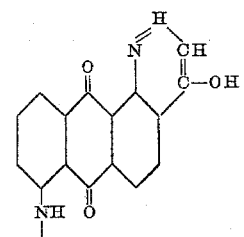

7. A process for the production of 4-hydroxy-7.8-phthaloylcinnolines which comprises treating a 1-amino-2-acetylanthraquinone of the general formula:

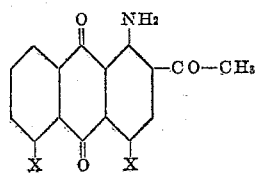

wherein one of the X's stands for a member of the class consisting of hydrogen, bromine, chlorine, nitro, amino and acylamino groups and the other X for hydrogen in a water-containing sulfuric acid medium with nitrous acid at a temperature of about 0–10° C.

8. A process for the production of 4-hydroxy-7.8-phthaloylcinnolines which comprises treating a 1-amino-2-acetylanthraquinone of the general formula:

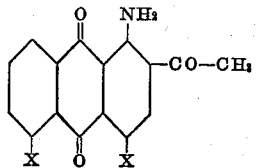

wherein one of the X's stands for a member of the class consisting of hydrogen, bromine, chlorine, nitro, amino and acylamino groups and the other X for hydrogen in a sulfuric acid medium containing from about 20 to 35 per cent of water with nitrous acid at a temperature of about 0–10° C.

FRIEDRICH EBEL.

No references cited.